United States Patent
Baumann et al.

(10) Patent No.: US 7,974,625 B2
(45) Date of Patent: Jul. 5, 2011

(54) METHOD, COMMUNICATION SYSTEM, CENTRAL INTERFACE DEVICE AND MOBILE TERMINAL FOR OPERATING A WIRELESS COMMUNICATION CONNECTION

(75) Inventors: Alexander Baumann, München (DE); Jürgen Brieskorn, Geltendorf (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1078 days.

(21) Appl. No.: 11/805,046

(22) Filed: May 22, 2007

(65) Prior Publication Data

US 2007/0268879 A1 Nov. 22, 2007

(30) Foreign Application Priority Data

May 22, 2006 (EP) .................................. 06010537

(51) Int. Cl.
*H04W 36/00* (2009.01)
(52) U.S. Cl. ........ 455/436; 455/437; 455/438; 455/442; 455/443; 370/331; 370/332
(58) Field of Classification Search ....... 455/432.1–444; 370/329–337, 352–356
See application file for complete search history.

(56) References Cited

U.S. PATENT DOCUMENTS

| 5,463,674 | A | 10/1995 | Gillig et al. | |
|---|---|---|---|---|
| 2004/0266426 | A1 | 12/2004 | Marsh et al. | |
| 2009/0154426 | A1* | 6/2009 | Perraud et al. | 370/332 |
| 2009/0310586 | A1* | 12/2009 | Shatti | 370/338 |

FOREIGN PATENT DOCUMENTS

| EP | 0 876 073 A2 | 11/1998 |
|---|---|---|
| WO | WO 2005/071998 A1 | 8/2005 |
| WO | WO 2006/053102 A1 | 5/2006 |

* cited by examiner

*Primary Examiner* — Rafael Pérez-Gutiérrez
*Assistant Examiner* — Neda Behrooz

(57) ABSTRACT

A method for operating a wireless communication connection comprising a first device using a first standard for LANs and providing a first radio coverage area, a second device operating according to a second standard and providing a second radio coverage area, the first and the second coverage areas overlapping, a mobile device operable according to the first and the second standards and a central interface device between the LAN and a switched telephone network, a voice data transmission according to the first standard is prioritized by the mobile device. A measurement is performed and a message including the measurement result and topology information relating to the LAN is transmitted to the central device. The central device uses the message to decide for a changeover of the operation of an existing connection from the first area to the second area, the mobile device initiating the changeover based on the decision.

19 Claims, 1 Drawing Sheet

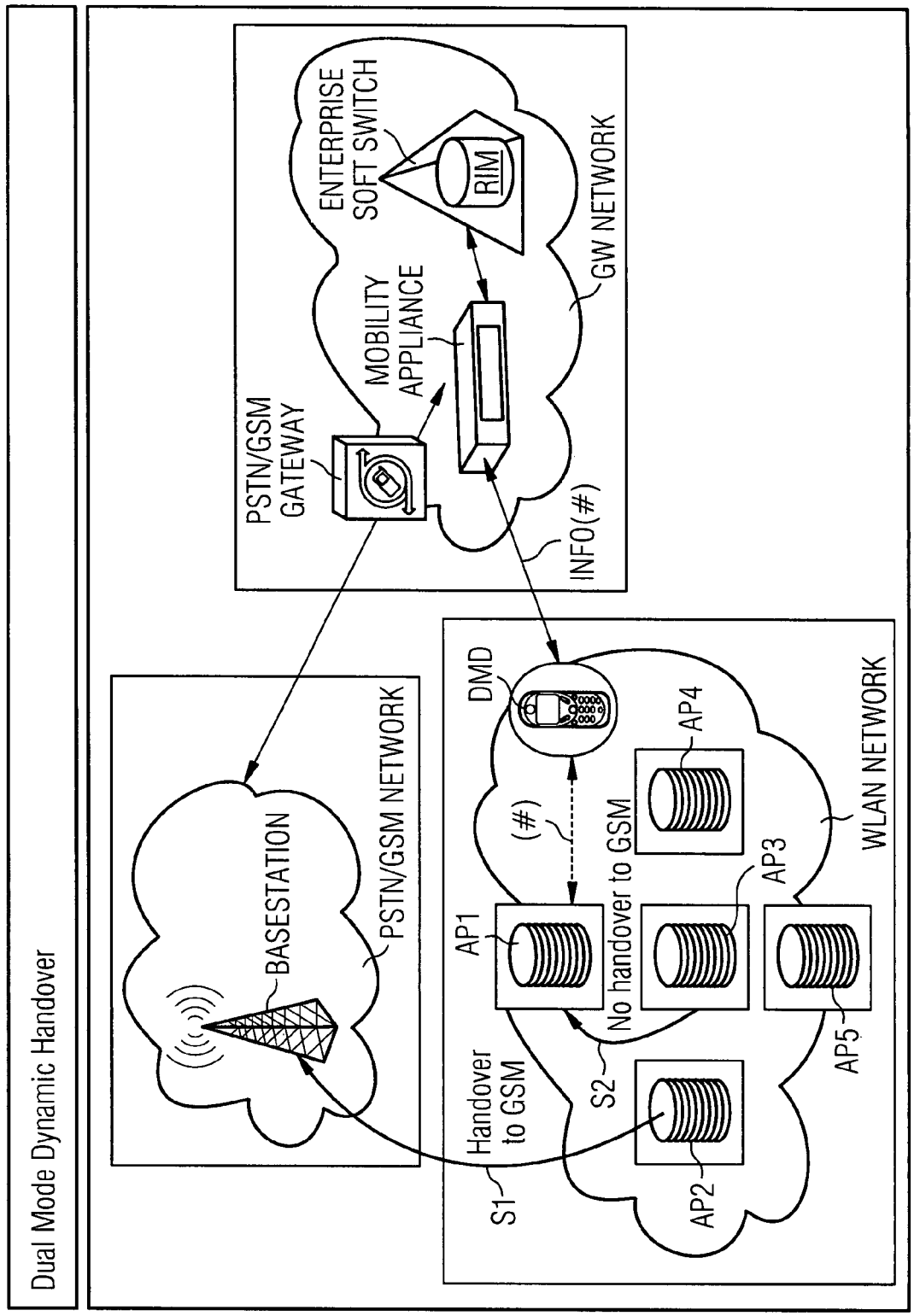

METHOD, COMMUNICATION SYSTEM, CENTRAL INTERFACE DEVICE AND MOBILE TERMINAL FOR OPERATING A WIRELESS COMMUNICATION CONNECTION

CROSS REFERENCE TO RELATED APPLICATIONS

This application claims priority of European application No. 06010537.6 EP filed May 22, 2006, which is incorporated by reference herein in its entirety.

FIELD OF INVENTION

The invention relates to a method for operating a wireless communication connection as well as to an arrangement for operating a communication connection, to a central interface device for operating a wireless communication connection as well as to a mobile terminal for operating a wireless communication connection.

BACKGROUND OF INVENTION

Various communications standards enabling communication to take place between terminals embodied according to these standards have become established in communications technology. In particular with the radio communication standards existing in parallel, such as the "Global System Mobile" (GSM) standard, the "Universal Mobile Telecommunications System" (UMTS) standard, the "Digital Enhanced Cordless Telecommunications" (DECT) standard, or the "Wireless Local Area Network" (WLAN) standard, which enable communication by means of portable or, as the case may be, mobile terminals, it is now more and more frequently the case that communications subscribers are users of several of these standards and consequently take a number of terminals about with them. As a result of this development a requirement for a terminal which operates according to a number of standards has arisen on the user side. This requirement occurs in particular in the business and commercial field.

For this purpose what are termed "dual mode" or "multi mode" devices have been developed which are capable of operating in accordance with more than one standard, said development being set to continue such that these devices will operate an existing connection even in a heterogeneous environment in which radio coverage areas of different standards are adjacent to one another or, as the case may be, overlap, even across standards, in particular in the case of a transition from a radio coverage area operating according to a first communication standard to a radio coverage area operating according to a second communication standard and what is referred to as a seamless handover being performed in the process.

SUMMARY OF INVENTION

An object underlying the invention is to provide a method and an arrangement which enable a dual mode terminal to be operated in an environment of the kind described.

This object is achieved by a method, by a communication system, by a central interface device as well as by the mobile terminal having the features of the independent claims.

According to the inventive method for operating a wireless communication connection comprising at least one first stationary radio transmitting/radio receiving device operating according to a first standard defining local area networks, in particular the IEEE 802.11 standard or its derivatives, and providing a first coverage area of a local area network, at least one second stationary radio transmitting/radio receiving device operating according to a second standard, in particular GSM, and providing a second radio coverage area, the first radio coverage area and the second radio coverage area at least partially overlapping, as well as a mobile radio transmitting/radio receiving device which can be operated according to the first and the second standard, and a central interface device between the local area network and a switched telephone network, a voice data transmission according to the first standard is prioritized on the part of the mobile radio transmitting/radio receiving device. In addition, at least one measurement of at least one variable indicating the quality of a radio connection operating according to the first standard, in particular a receive field strength measurement, is performed and a first message at least including the measurement results and containing topology information relating to the local area network is transmitted to the central interface device. Furthermore the central interface device takes a decision, at least on the basis of one of the first messages, regarding the initiation of a changeover of the operation of an existing voice data communication connection from the first radio coverage area to the second radio coverage area, the mobile radio transmitting/radio receiving device initiating said changeover based on the decision.

The advantage of the method according to the invention is that in a communication system in which voice data transmissions take place on a prioritized basis by means of a usually cheaper, wireless communication over a local area network, in the case of deteriorating connection conditions a transfer of the communication in the sense of a handover can be performed which takes place adapted to the respective local area network. In this case the adaptation is made possible in that said handover is initiated by the central interface device and consequently knowledge that a central unit of this kind possesses can be used in an advantageous manner for said handover and currently available mobile radio transmitting/radio receiving devices can be used for the advantageous method according to the invention largely without adaptations and modifications.

A minor change is necessary merely for the advantageous development wherein the mobile radio transmitting/radio receiving device takes a decision, based on the evaluation of stored information, regarding an activation of a communication according to the second standard and in the case of a positive decision performs the handover and in the case of a negative decision continues to operate the voice data communication over a communication connection according to the first standard. However, this is associated with the advantage that the mobile radio transmitting/radio receiving device can respond flexibly to local characteristics or, as the case may be, specifications. In this way it is possible, for example, that at the location of the first stationary radio transmitting/radio receiving device a switchover to a communication according to the second standard is not desirable, as would be the case, for example, in a hospital.

With the method according to the invention, the measurement results are preferably determined on a repetitive cyclical basis. This has the advantage that current connection characteristics are available at all times.

The first message is also preferably transmitted on a cyclical basis so that the central interface device likewise has a current picture of the connection characteristics.

It is particularly advantageous in this case if information identifying the first stationary radio transmitting/radio receiving device is integrated into the first message. This will enable the central interface device to track via which first radio transmitting/radio receiving device the mobile radio transmitting/radio receiving device is being operated.

This can be applied in a particularly advantageous manner above all for the advantageous development wherein, as a basis for the decision on the part of the central interface device, contents organized as a first table are accessed, since the central interface device can perform an evaluation of the contents with the aid of the information relating to the first stationary radio transmitting/radio receiving device.

In this case the first table preferably contains topology information relating to the local area network, the topology information preferably being kept organized in a memory in such a way that the geographical position of first stationary radio transmitting/radio receiving devices can be established. These developments have the advantage that on the basis of the identification information the central interface device is placed into the situation of being able to establish the location of the first stationary radio transmitting/radio receiving device and at the same time can evaluate its position in relation to the neighboring first radio transmitting/radio receiving devices. By this means it is made possible to perform or, as the case may be, initiate a handover selectively only when the first stationary radio transmitting/radio receiving device is a device which is located in an edge zone of the local area network and in the event of a further movement of the mobile radio transmitting/radio receiving device a further deterioration or, as the case may be, loss of the connection according to the first standard is actually likely and in this case a handover to a connection according to the second standard can ensure an interrupt-free continuation of a current voice data communication.

In a further development of the method according to the invention the first table is kept organized in a memory in such a way that it also includes activation information relating to the respective first stationary radio transmitting/radio receiving devices.

As an alternative hereto the mobile radio transmitting/radio receiving device holds the information in particular organized as a second table in readiness in a memory of the terminal. With this variant the advantage is produced that a user can set whether an activation of a communication connection according to the second standard is permitted or, as the case may be, desirable at the current location or not.

In this case the information is preferably organized as an assignment of SSID values identifying first stationary radio transmitting/radio receiving devices to activation information so that when a handover is made from a first radio transmitting/radio receiving device to another first stationary radio transmitting/radio receiving device, the mobile radio transmitting/radio receiving device can always extract locally valid activation information.

The central interface device preferably operates as a device providing extension functionality. In this case the central interface device is preferably connected to the local area network at least partially in a corded manner. This also enables messages to be received and sent when wireless connections are of low quality or, as the case may be, if said wireless connections are lost. Alternatively or additionally hereto the central interface device operates in such a way that it can communicate wirelessly with the mobile radio transmitting/radio receiving device directly and/or with the aid of the local area network. This increases the flexibility and fault tolerance of the central interface device compared with a purely corded approach.

The object underlying the invention is also achieved by a communication system of a central interface device as well as by a mobile terminal which make their contribution to the achievement of the inventive object by having means for performing the method.

BRIEF DESCRIPTION OF THE DRAWINGS

Further advantages and details will be explained in more detail with reference to an exemplary embodiment depicted in the single FIGURE, in which the FIGURE shows a schematic representation of a communication system performing the method according to the invention.

DETAILED DESCRIPTION OF INVENTION

The FIGURE shows a schematic representation of a communication system in which the method according to the invention takes effect in a particularly advantageous manner.

In the FIGURE can be seen a local area network WLAN NETWORK which includes a plurality of stationary radio transmitting/radio receiving devices, referred to as access points AP1 to AP5, which enable a communication via an air interface which is embodied in accordance with the IEEE 802.11 standard.

Also to be seen is a second radio coverage area PSTN/GSM NETWORK which enables a switched communication operating in accordance with the GSM standard via a plurality of base stations BASESTATION. In this case only one base station BS is shown for the sake of simplicity.

Also to be seen is a network composed of distributed devices which has a connection both to the local area network WLAN NETWORK and to the radio network PSTN/GSM NETWORK and provides a function in the sense of a private branch exchange. In this scenario said network GW NETWORK communicates with the switched radio network PSTN/GSM NETWORK via what is referred to as a gateway PSTN/GSM GATEWAY. It also communicates via WLAN with a mobile radio transmitting/radio receiving device DMD which, according to the exemplary embodiment of the invention, is embodied as what is referred to as a dual-mode device DMD and can therefore operate both a connection via WLAN and a connection via GSM. In addition it has a connection to a station ESS designated as an enterprise soft switch.

Said network GW NETWORK additionally has what is referred to as a RIM table RIM which can be embodied for example, as can be seen in the illustration, as a decentralized database ESS residing in the enterprise soft switch and makes data available to a central interface device MOBILITY APPLIANCE that is also included in the network GW NETWORK.

In this case the aforesaid data is topographical information # which enables the central interface device MOBILITY APPLIANCE to determine the precise position of an access point AP1 to AP5 on the basis of identification information #, in particular, however, also whether the respective access point AP1 to AP5 is located at the edge of the local area network and therefore has at least partially adjacent areas without radio coverage or whether the access point is located within the network WLAN NETWORK such that it is surrounded on all sides by radio coverage areas.

With this information # it can thus be advantageously decided according to the invention whether a handover of a WLAN connection which is being maintained by the dual-mode device DMD is to be transferred into the switched network PSTN/GSM NETWORK or not.

By means of this approach it is possible to conduct calls favorably using Voice over IP, preferably therefore in the WLAN, and not switch over to a usually more expensive, switched call via the public radio network PSTN/GSM NETWORK until it really is likely that the dual-mode device DMD is moving out of the network WLAN NETWORK.

So that the central interface device MOBILITY APPLIANCE now knows when a switchover of this kind has to take place, the dual-mode device DMD ascertains the received signal field strength, which is also known as the so-called RSSI value, at regular intervals and transmits this value together with identification information via a message information element to the central interface device MA.

Each time after a message information element of this kind is received, the central interface device MA establishes via the table RIM the location of the current access point AP1 to AP5 of the network WLAN to which the dual-mode device DMD is connected. If said information # now indicates that the access point AP is located in an edge zone and if the RSSI value is low, with the result that an interruption of a current connection would be probable, the central interface device for its part sends a message INFO(#) to the dual-mode device DMD with the recommendation to switch over from WLAN to GSM and to transfer any connection hereto or, as the case may be, to operate future connections via said network.

According to the inventive method the dual-mode device will now perform the handover to the GSM in a first step S1.

Alternatively or in addition the dual-mode device DMD for its part in turn contains information relating to whether a GSM is permitted or desirable at all at the current position at which it is located. For example, it could be located in a hospital, where the radio communication via GSM has to be deactivated. In a possible embodiment in such a case there will now be displayed to the user of the dual-mode device DMD a message by means of which he or she is notified of the necessary activation of the GSM and in response to which he or she can then actively allow or refuse this. In the latter case, in a second step S2, no handover to GSM would be performed and an interruption would be accepted or other methods would be employed.

The invention claimed is:

1. A method for operating a wireless communication connection, having a first stationary radio transmitting/radio receiving device operating according to a first standard defining local area networks and providing a first coverage area of a local area network, and a second stationary radio transmitting/radio receiving device operating according to a second standard and providing a second radio coverage area, wherein the first and second radio coverage areas at least partially overlap, the method comprising:
    at a mobile radio transmitting/radio receiving device operable according to the first and the second standards:
        measuring a variable indicating a quality of a radio connection operating according to the first standard, and
        transmitting a first message including a measurement result from the measuring of the variable and topology information relating to a local area network, the message transmitted to a central interface device located between the local area network and a switched telephone network;
    deciding, by the central interface device, if a changeover of an existing voice data communication connection from the first radio coverage area to the second radio coverage area should occur at least based on the first message;
    transmitting, by the central interface device, a second message to the mobile radio transmitting/radio receiving device suggesting a changeover of the existing voice data communication connection from the first radio coverage area to the second radio coverage area;
    receiving the second message by the mobile radio transmitting/radio receiving device;
    the mobile radio transmitting/radio receiving device evaluating information stored in the mobile radio transmitting/radio receiving device to determine whether the changeover suggested via the second message should be performed;
    if the mobile radio transmitting/radio receiving device determines that the suggested changeover should occur, the mobile radio transmitting/radio receiving device initiating the changeover; and
    if mobile radio transmitting/radio receiving device determines that the suggested changeover should not occur, the mobile radio transmitting/radio receiving device does not initiate the suggested changeover; and
    wherein the first standard is different from the second standard.

2. The method as claimed in claim 1, wherein the variable indicating the quality of a radio connection operating according to the first standard is a receive field strength measurement.

3. The method as claimed in claim 1, wherein the second standard is a GSM standard and the first standard is IEEE 802.11 or a derivative thereof.

4. The method as claimed in claim 1, further comprising the mobile radio transmitting/radio receiving device prioritizing a voice data transmission according to the first standard and wherein the measurement result is determined on a repetitive cyclical basis and wherein the transmission of the first message is repeated on a cyclical basis.

5. The method as claimed in claim 1 further comprising:
    the mobile radio transmitting/radio receiving device displaying to a user a message to notify the user of the changeover suggested by the central interface device and subsequently receiving user input that identifies whether the mobile radio transmitting/radio receiving device should initiate the suggested changeover, the user input being at least a portion of the information stored in the mobile radio transmitting/radio receiving device that is evaluated by the mobile radio transmitting/radio receiving device.

6. The method as claimed in claim 1, wherein information identifying the second stationary radio transmitting/radio receiving device is integrated into the first message.

7. The method as claimed in claim 1, wherein the basis for the decision by the central interface device includes information accessed from a first table.

8. The method as claimed in claim 7, wherein first table contains topology information relating to the local area network.

9. The method as claimed in claim 8, wherein the topology information provides for a determination of a geographical position of the first stationary radio transmitting/radio receiving device.

10. The method as claimed in claim 7, wherein the first table provides activation information relating to the first stationary radio transmitting/radio receiving device.

11. The method as claimed in claim 1, wherein the mobile radio transmitting/radio receiving device is a mobile terminal, the mobile terminal stores activation information in a second table of the terminal.

12. The method as claimed in claim 11, wherein the information is organized as an assignment of SSID values identifying first stationary radio transmitting/radio receiving devices to activation information.

13. The method as claimed in claim 1, wherein the central interface device operates as a device providing extension functionality.

14. The method as claimed in claim 1, wherein the central interface device is connected to the local area network at least partially in a corded manner.

15. The method as claimed in claim 1, wherein the central interface device is adapted to communicate wirelessly with the mobile radio transmitting/radio receiving device directly or with the aid of the local area network.

16. A communications system, comprising:
a first stationary radio transmitting/radio receiving device operating according to a first standard and providing a first coverage area of a local area network;
a second stationary radio transmitting/radio receiving device operating according to a second standard and providing a second radio coverage area, the second standard being different from the first standard and wherein the first and second radio coverage areas at least partially overlap;
a central interface device located between the local area network and a switched telephone network; and
a mobile radio device operable according to the first and the second standards; wherein the mobile radio device:
prioritizes a voice data transmission according to the first standard,
measures a receive field strength measurement that indicates a quality of a radio connection operating according to the first standard, and
transmits a first message including the measurement result of the measured receive field strength and topology information relating to the local area network to the central interface device,
the central interface device deciding if a changeover of an existing voice data communication connection from the first radio coverage area to the second radio coverage area should occur at least based on the first message,
the central interface device transmitting a second message to the mobile radio device suggesting a changeover of the existing voice data communication connection from the first radio coverage area to the second radio coverage area; and
the mobile radio device receiving the second message and evaluating information stored in the mobile radio device to determine whether the changeover suggested via the received second message should be performed;
if the mobile radio device determines that the suggested changeover should occur, the mobile radio device initiating the changeover; and
if mobile radio device determines that the suggested changeover should not occur, the mobile radio device does not initiate the suggested changeover.

17. A mobile terminal operable to a first standard and a second standard that is different from the first standard, wherein
the mobile terminal prioritizing a voice data transmission according to the first standard;
the mobile terminal measuring a receive field strength to obtain at least one receive field strength measurement result indicating a quality of a radio connection operating according to the first standard; and
the mobile terminal transmitting a first message including the at least one receive field strength measurement result and topology information relating to a local area network to a central interface device located between the local area network and a switched telephone network; and
the mobile terminal receiving a second message from the central interface device suggesting a changeover of an existing voice data communication connection from the first radio coverage area to the second radio coverage area;
the mobile terminal obtaining input from a user to determine whether the changeover suggested via the received second message should be performed;
if the mobile radio device determines that the suggested changeover should occur, the mobile radio device initiating the changeover; and
if mobile radio device determines that the suggested changeover should not occur, no initiation of the suggested changeover occurs.

18. The mobile terminal as claimed in claim 17, wherein the first standard is IEEE 802.11 or a derivative thereof and wherein the second standard is a GSM standard.

19. The mobile terminal as claimed in claim 17, wherein the obtained input from the user is obtained via the mobile terminal prompting the user by displaying a message relating to the suggested changeover.

* * * * *